United States Patent [19]

Blodgett

[11] Patent Number: 4,786,222

[45] Date of Patent: Nov. 22, 1988

[54] FOLDING AUTOMOBILE STORAGE DECK ASSEMBLY

[75] Inventor: William W. Blodgett, Fairlawn, Ohio

[73] Assignee: Carvan, Inc., Akron, Ohio

[21] Appl. No.: 48,255

[22] Filed: May 11, 1987

[51] Int. Cl.⁴ .............................................. B60P 3/08
[52] U.S. Cl. ..................................... 410/29; 105/372
[58] Field of Search ........................ 105/370, 371, 372; 238/10 R; 410/3, 4, 24, 26, 29

[56] References Cited

U.S. PATENT DOCUMENTS

| | | | |
|---|---|---|---|
| 415,878 | 11/1889 | Moore | 105/372 |
| 1,229,714 | 6/1917 | Clark et al. | 105/370 |
| 2,009,149 | 7/1935 | Pierce | 410/29 |
| 2,432,228 | 12/1947 | DeLano | 410/26 |
| 2,461,927 | 2/1949 | Schaldach et al. | 410/26 |
| 2,636,772 | 4/1953 | Bridge | 105/372 |
| 2,834,631 | 5/1958 | Taraldsen | 410/29 |

FOREIGN PATENT DOCUMENTS

| | | | |
|---|---|---|---|
| 0005960 | 12/1979 | European Pat. Off. | 105/372 |
| 359496 | 10/1931 | United Kingdom | 410/29 |
| 716260 | 9/1954 | United Kingdom | 410/26 |

*Primary Examiner*—George L. Walton
*Attorney, Agent, or Firm*—Oldham & Oldham Co.

[57] ABSTRACT

A folding automobile storage deck for semitrailers which allows a semitrailer so equipped to be used for either automobile or general freight transportation. The deck comprises both folding and swivel deck sections which are longitudinally divided, and which may be disposed either in a vertical storage position, the general freight carrying mode, or horizontally deployed and connected together when automobiles are to be carried. The swivel deck section is designed so that all points of attachment between the deck and the sidewalls, except the point at which the deck is swiveled may be disconnected and the ends of the deck support members thus disconnected telescoped into the deck section, thereby allowing the deck to be swiveled up or down as necessary during the process of automobile loading or unloading and reconnected when the process is completed.

20 Claims, 5 Drawing Sheets

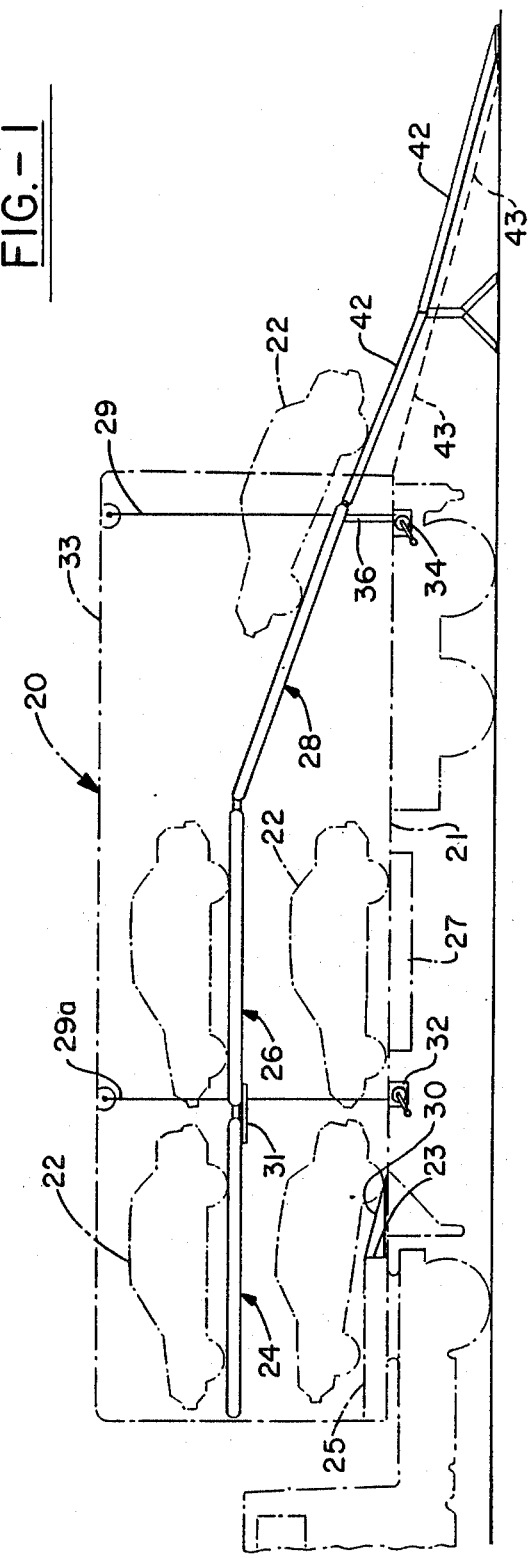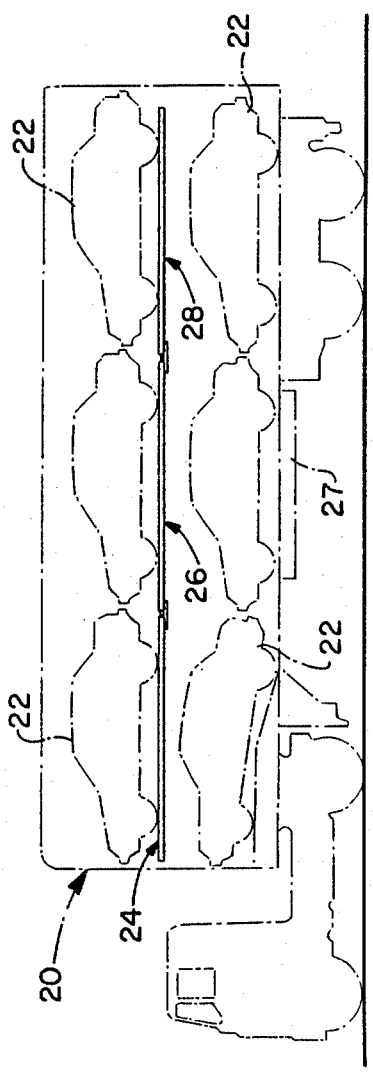

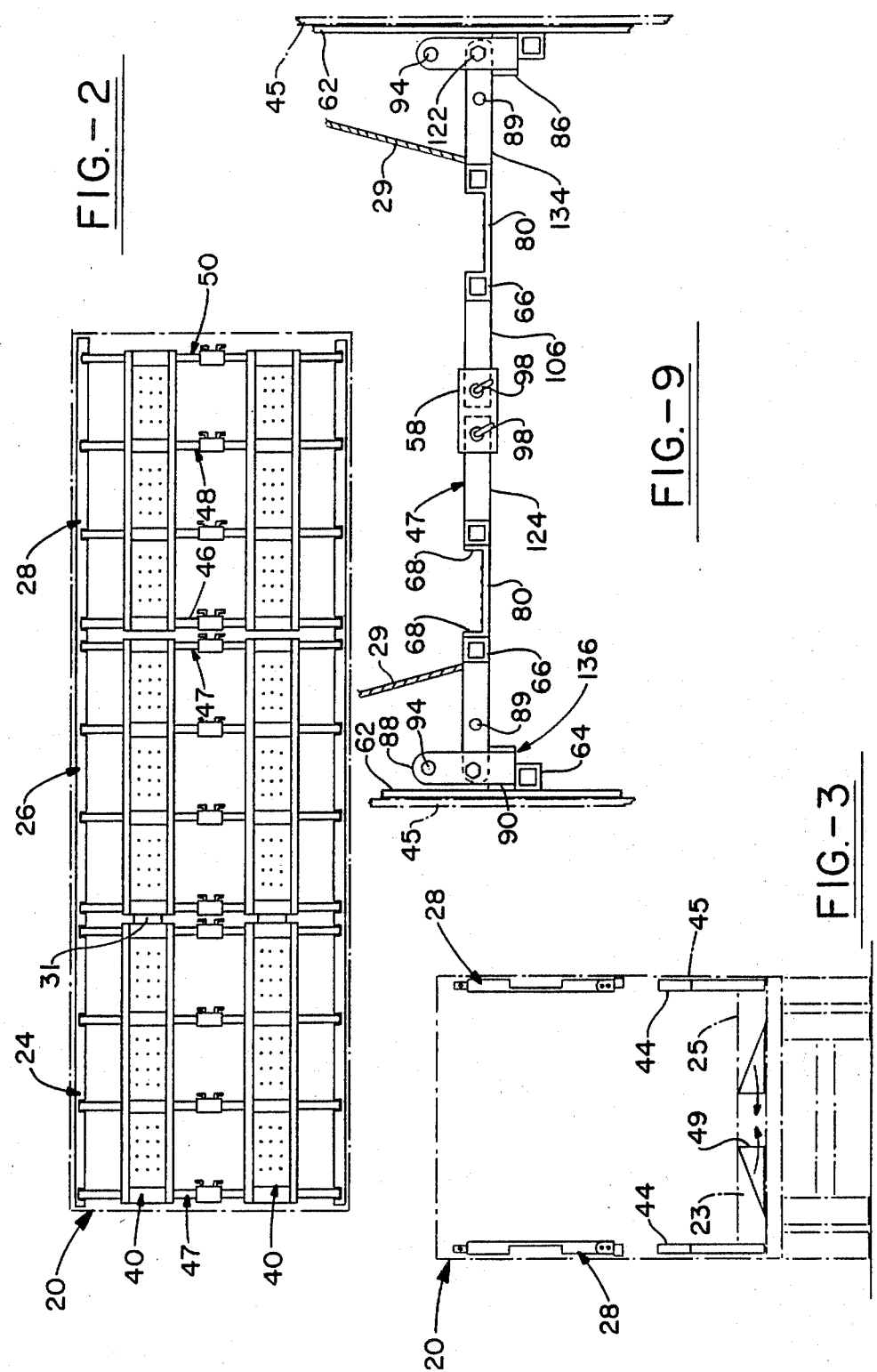

FOLDING AUTOMOBILE STORAGE DECK ASSEMBLY

TECHNICAL FIELD

This invention relates to an improved automobile storage deck. More particularly, this invention relates to an automobile storage deck for semitrailers useful for carrying either general freight cargo or automobiles. Specifically, this invention relates to a folding automobile storage deck for carrying automobiles in semitrailers, which can be folded in an out-of-the-way storage position when the semitrailer is to be used for carrying general freight cargo.

In co-pending application Ser. No. 850,836 for "Convertible Automobile Carrier", there is described an invention relating to a semitrailer truck which can be converted from one carrying mode to another carrying mode, so as to have the capability of transporting either automobiles or general freight, whichever is desired. The semitrailer of the invention therein disclosed can with a minimum of effort, readily be converted from its automobile carrying mode to its general freight carrying mode, thus making it more versatile and considerably alleviating the back-haul problem which would otherwise be encountered in automobile manufacturing areas.

Although the semitrailer described in that application is more versatile than previously designed multi-purpose trucks, the degree of success achieved by a multi-purpose truck depends to a large extent on how compactly the automobile storage deck assembly can be stored when it is not in use. In addition, acceptance of such a truck is affected to a large degree by how easily the truck can be converted from one carrying mode to the other. While the automobile storage deck described in the co-pending application is capable of carrying either general freight or automobiles, the semitrailer therein described, and other semitrailers of a convertible nature, would be made even more useful if the automobile carrying deck had the capability of being stored more compactly, and if other desirable features herein disclosed were incorporated in its design.

DISCLOSURE OF THE INVENTION

In light of the foregoing, a first aspect of the invention is the provision of an automobile storage deck, having a more compact storage design than hitherto available, useful in a convertible semitrailers.

A further aspect of the invention is to provide an automobile storage deck for a convertible semitrailer which is easily transformed from an automobile carrying mode to a freight carrying mode, or vice versa.

Still another aspect of this invention is the creation of an automobile carrying deck of a design which makes its conversion between a general freight carrying mode and an automobile carrying mode both quick and simple to accomplish.

Another aspect of the invention is the design of an automobile storage deck for convertible semitrailers which is inexpensive to construct, durable, and which has a long life expectancy.

Yet another aspect of the invention is to produce an automobile storage deck which allows automobiles to be securely stored thereon during their transportation in a semitrailer.

The foregoing and other aspects of the invention which will become apparent as the detailed description proceeds are achieved by a convertible automobile storage deck assembly for use with a truck capable of dual, convertible, freight hauling modes comprising:
 a folding deck, and
 a swivel deck,
both said decks being divided in their centers into longitudinal halves which can be pivoted from a vertical, stored, general freight carrying mode adjacent the sidewalls of the truck, to a deployed, horizontal, automobile carrying mode wherein said longitudinal halves are fastened together to form an automobile carrying deck, said swivel deck being swivelable vertically up or down about swivel means at its swivel end, and wherein said swivel deck is braced by a plurality of support members which include sleeve members and slider members, said slider members fastening said support members to the sidewalls of the truck when said swivel deck is in its stored mode, or in its deployed mode, but wherein said slider members can be disconnected from said sidewalls and telescoped into said sleeve members when the swivel deck is to be swiveled about its swivel end during automobile loading or unloading.

Other aspects of the invention are attained by a semi-trailer truck capable of conversion from a general freight carrying mode to an automobile carrying mode which includes a convertible automobile storage deck assembly, said assembly comprising:
 a folding deck, and
 a swivel deck,
both said decks being divided in their centers into longitudinal halves which can be pivoted from a vertical, stored, or general freight carrying mode adjacent the sidewalls of the truck, to a deployed, horizontal, automobile carrying mode wherein said halves are fastened together to form an automobile carrying deck, said swivel deck being swivelable vertically up or down about swivel means at its pivot end, and wherein said swivel deck is braced by a plurality of support members which include sleeve members and slider members, said slider members fastening said support members to the sidewalls of the truck when said swivel deck is in its stored mode, or in its deployed mode, but wherein said slider members can be disconnected from said sidewalls and telescoped into said sleeve members when the swivel deck is to be swiveled about its swivel end during automobile loading or unloading.

BRIEF DESCRIPTION OF THE DRAWINGS

The invention will be better understood when reference is had to the accompanying drawings forming a part hereof in which:

FIG. 1 is a side view showing a storage deck assembly in accordance with this invention illustrating generally how it may be applied to loading automobiles into a semi tractor-trailer, the elements of the invention being in solid lines while other conventional elements are shown in ghost dot-dashed lines.

FIG. 1A is a side view showing a fully-loaded semi tractor-trailer in ghost lines and the storage deck assembly in solid lines in a traveling position.

FIG. 2 is a top plan view of the storage deck assembly in the deployed position shown in FIG. 1A.

FIG. 3 is an end view of the semi tractor-trailer shown in FIG. 1A illustrating the stowed position of the storage deck assembly.

FIG. 9 provides an end view of a folding deck track support and associated structure in its deployed position.

BEST MODE FOR CARRYING OUT THE INVENTION

Figure 4:
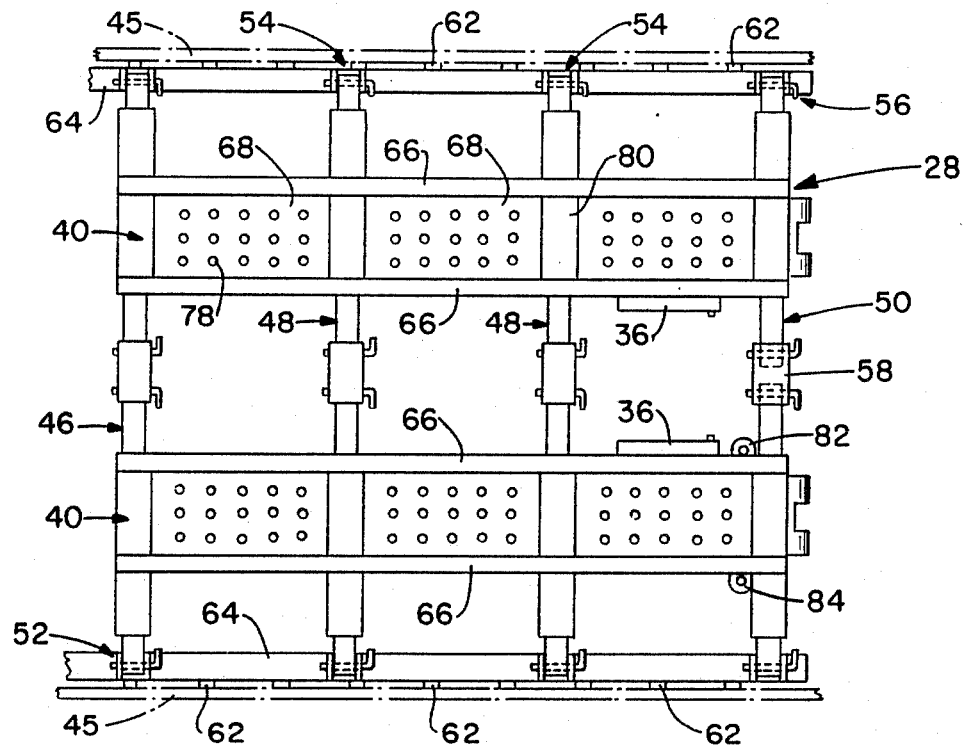
FIG. 4 illustrates an enlarged top view of a swivel deck of the invention.

FIG. 1 shows a semitrailer of the invention in the process of being loaded with automobiles. In the Figure, the semitrailer 20 is shown with automobiles 22 resting on a structure which includes folding front deck 24, folding middle deck 26, and swivel deck 28. An automobile is also shown with its front wheels resting on the fifth wheel deck 25, having been placed there by driving the automobile passed drop bulk head 23 with the assistance of a stowable incline deck 30. In the loading process, swivel deck 28 has been lowered to the loading position shown and connected to loading ramps 42 which detachably connected with each other, and with the swivel deck. When not in use, loading ramps 42 may be stored in a loading ramp storage compartment 27 if desired. Swivel deck 28 may be raised or lowered by means of a winch cable 29 which is operated by rear winch 34. Folding middle deck 26 is raised and lowered by means of winch cable 29a, operated by front winch 32. Advantageously, a deck interlock means is provided, which may be a steel plate 31 attached to fixed middle deck 26 underneath thereof, so that when the folding middle deck is raised, the deck interlock means 31 contacts and raises folding front deck 24 simultaneously. If desired, however, separate winches and winch cables may be provided for each of the folding decks 24 and 26. While FIG. 1 shows two folded decks 24 and 26, smaller decks being somewhat easier to install in the semitrailer, it is possible to employ a single large folding deck in place thereof.

In the loading process, the longitudinal halves of folding decks 24 and 26 are lowered from their storage position to the horizontal position shown, and fastened together in place by means which will be described hereinafter. The longitudinal halves of swivel deck 28 are also lowered into position, fastened together, and swiveled downward in a manner hereinafter described, to the position shown, after which drop legs 36 are deployed in a vertical supporting position. Loading ramps 42 are then positioned in place, and automobiles are driven onto all three decks. Loading ramps 42 are then disconnected, and swivel deck 28 is pivoted upward into its horizontal position and secured. Loading ramps 43, shown by dotted lines, are then attached to the floor deck 21, and loading is completed by placing automobiles beneath those stored on the upper decks.

FIG. 1A is a cross-section of the semitrailer, completely loaded with automobiles, and in condition for transporting of the same to their destination.

FIG. 2 is a cross sectional top view of semitrailer 20 showing folding front deck 24 at the front of the semitrailer, folding middle deck 26 at its middle, and swivel deck 28 at the rear of the semitrailer. Also shown are folding deck track supports 47, swivel deck track swivel support 46, swivel deck track intermediate supports 48, and swivel deck track lifting support 50. The track supports shown support automobile tracks 40, used for the storage of automobiles. Deck interlock means 31, being, for example, a steel plate attached to folding middle deck 26, can also be seen in the Figure. Alternative interlock means may also be employed, if desired.

FIG. 3 shows the semitrailer of the invention in a mode adapted for the transportation of general freight. In the Figure, the semitrailer 20 is illustrated with swivel deck longitudinal halves 28 in their raised, stored position. Incline deck halves 44 have been raised and stored adjacent to sidewall 45 of the semitrailer, and the triangular incline deck supports 49 have been hingably folded against drop bulk head 23. Arrows adjacent the parts mentioned illustrate their direction of movement in the process of deployment for use. While not absolutely mandatory, it is desirable that incline deck 30, which may take forms other than that shown, be stowable in the manner shown, or in some other way, so that a towmotor lift truck can proceed forward in the semitrailer as far as possible to facilitate loading of the fifth wheel deck 25.

While dimensions will ordinarily vary depending upon the number and types of cars to be transported, in a trailer 40 to 48 feet long, each of the upper tier automobile carrying decks generally will be from about 160 inches to 195 inches long, while the height of the semitrailer from floor deck 21 to its top will be about 110 to 120 inches high. The fifth wheel deck 25 will typically be from about 6 to 10 feet long and about 12 inches high, measured from the floor deck 21.

FIG. 4, is a top view of swivel deck 28 showing automobile carrying tracks 40 comprising track curb members 66, track gutter members 68 which are fitted with "pooch" projections 78, and which have stiffener plates 80 for added strength. Attached to track curb members 66 are drop legs 36 which are stored horizontally, parallel to tracks 40 except during the loading process, at which time they are swung to a vertical, supporting position. Attached to the tracks 40 are split lugs 82 and swivel lugs 84 which are used, respectively, in pivoting, "splitting", the swivel deck from or to its automobile carrying mode, or swiveling the swivel deck 28 during the automobile loading or unloading process. Also shown in the Figure are swivel deck track swivel support 46, swivel deck track intermediate supports 48, and swivel deck track lifting support 50. The supports are anchored to the semitrailer sidewalls 45 by means of swivel deck swivel perches 52, swivel deck intermediate perches 54, and swivel deck lifting perch 56. The perches themselves are mounted to semitrailer sidewalls 45 by longitudinal perch mount members 64, attached to logistic posts 62, which themselves are attached to the sidewalls 45. As shown in FIG. 4, the two longitudinal halves of swivel deck 28 are connected at their center by means of center splint sleeves 58.

While dimensions may vary, the width of the semitrailer from sidewall 45 to sidewall 45 may be about 94 to 104 inches wide, while the track gutter members 68 will be from about 7 to about 19 inches in width, and the tracks 40 will be about 20 to 26 inches apart.

Figure 5:
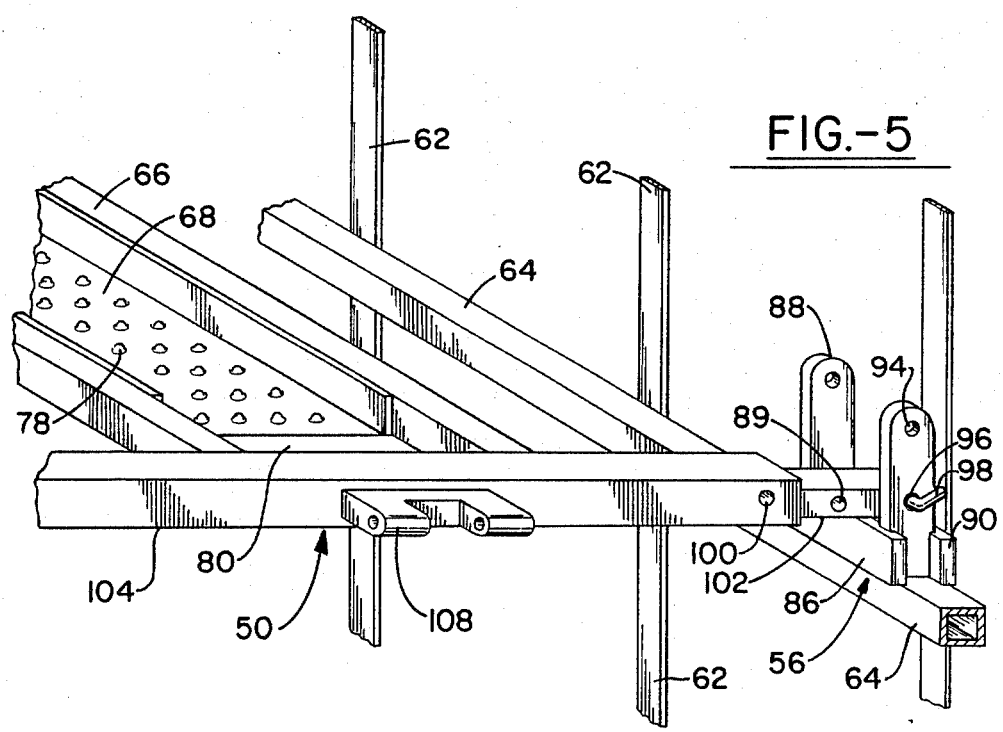
FIG. 5 is an isometric view of a swivel deck lifting perch and its associated structure.

FIG. 5 shows an isometric view of the swivel deck track lifting support 50 at the point which the support is attached to the swivel deck lifting perch 56. In the Figure, may be seen logistic posts 62 to which is attached longitudinal perch mount member 64. Swivel deck lifting perch 56, mounted thereon, comprises tuning block 86, perch rear member 90, and perch side members 88, with lift slider 102 being attached to the swivel deck lifting perch by means of locking pin 98 inserted at pivot hole 96 through pin tube 92 associated with lift slider 102. Perch side members 88 contain storage fastening holes 94, which are used in conjunction with pin tube 89, also associated with slider 102, when the swivel deck track lifting support 50 is placed in its vertical storage mode by having a locking pin 98 inserted through said holes and pin tube 89, thereby locking the lifting support in its stored position. Sleeve lock hole 100 may also be seen, which serves the purpose of locking lift slider 102 in its telescoped position by means of a locking pin 98 passed through said hole and pin tube 89 when the lift slider has been telescoped into lift sleeve 104 prepatory to swiveling swivel deck 28 up or down. In the Figure may be seen the positional relationship between track gutter member 68 and track curb member 66, their attachment being accomplished by welding, bolting, or by other means, and the Figure also shows details of the pooching 78 of the gutter member. A portion of the long center member 106 of swivel deck track lifting support 50 is also shown, as is loading ramp hinge bracket 108. The tuning block 86 is an important feature of swivel deck lifting perch 56 in that it serves the purpose of adjusting the angle, which should be substantially horizontal, at which lift slider 102 is disposed. This angle may be suitably adjusted by grinding away a portion of the tuning block 86 or welding to it to raise the height of the tuning block to a suitable level. Perch rear member 90 provides reinforcing support to the swivel deck lifting perch 56.

Dimensions may be altered within a fairly broad range; however, lift slider 102 may conveniently be fashioned from steel, as may all the other decks members, and have a dimension of approximately two inches high by two inches wide, with a thickness of about 3/16 of an inch. Lift sleeve 104 will normally be about 2½ inches high by 2½ inches wide and 3/16 of an inch thick, approximately the same dimensions as the track curb members 66. Stiffener plate 80, also shown in the Figure, may have a dimension of about ¾ of an inch thick by about 6 to 8 inches long, and 15 to 19 inches wide.

Figure 6:
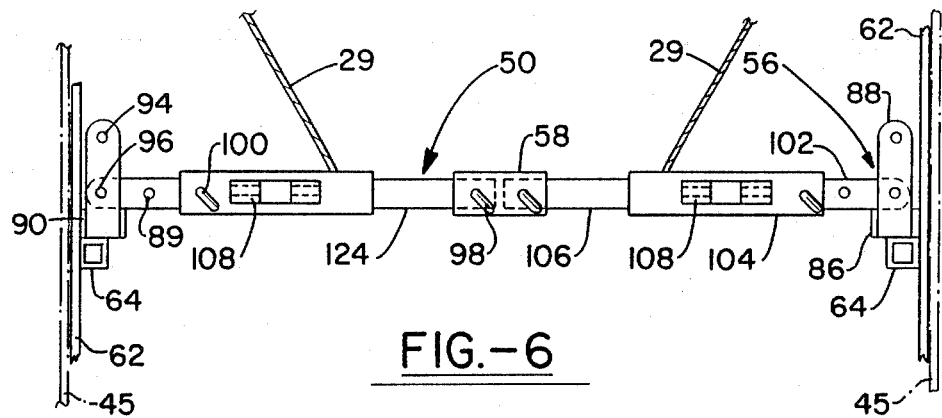
FIG. 6 provides an end view of a swivel deck track lifting support and associated structure in the process of deployment.

FIG. 6 shows an end view of the swivel deck track lifting support 50 and associated decking in the process of being "split", that is, pivoted to, or from its storage position. In the Figure, may be seen sidewalls 45, logistic posts 62, to which are attached swivel deck lifting perches 56 by means of longitudinal perch mount member 64. Perches 56, which rest on longitudinal perch mount members 64, comprise perch rear members 90, tuning blocks 86, perch side members 88, in which may be seen storage fastening holes 94. Attached to perches 56 are slider members 102 by means of locking pins 98, inserted through pin tubes 92 associated with sliders 102, at pivot holes 96.

Also shown in the sliders 102 are pin tubes 89. Lift sleeves 104, which encompass slider members 102, contain sleeve locking holes 100 through which locking pins 98 are placed to secure the position of the sliders relative to the sleeves during the splitting process, and during storage. Loading ramp hinge brackets 108 are shown, as is the long center member 106 and the short center member 124. Center splint sleeve 58, attaches the center members 106 and 124, by means of locking pins 98. The respective longitudinal halves of the swivel deck track lifting support 50 are split, i.e. pivoted about the swivel deck lifting perches 56, by means of winch cables 29, which are shown in their split positions.

Figure 6A:
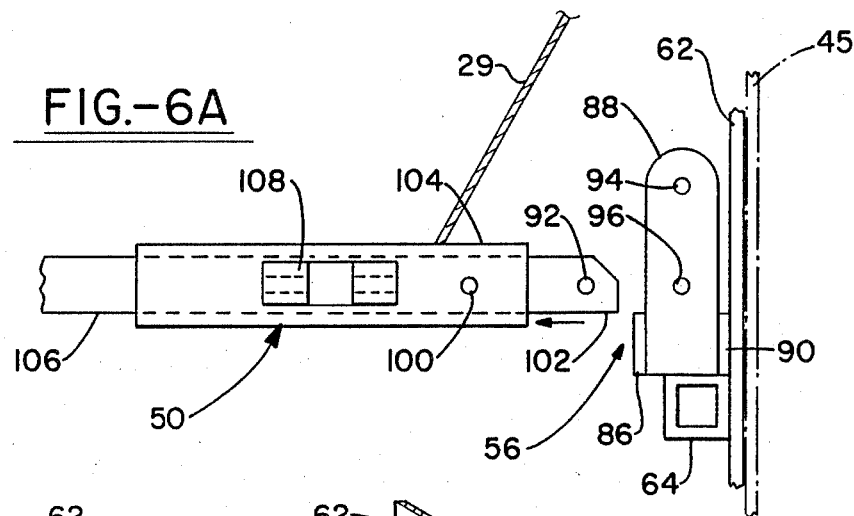
FIG. 6A is a broken out end view of the swivel deck track lifting support with a telescoped slider and the winch cable positioned for swiveling.

FIG. 6A shows a portion of the swivel deck track lifting support in its telescoped position, including longitudinal perch mount member 64, and swivel deck lifting perch 56, the latter comprising tuning block 86, perch rear member 90, and perch side members 88. Storage fastening hole 94 and pivot hole 96 are shown disposed in perch side member 88. The Figure illustrates by the adjacent arrow how lift slider 102 telescopes within lift sleeve 104 so that swivel deck track lifting support 50 may be swiveled by winch cable 29, which is shown in the swivel mode. Also shown is locking pin 98, which has been inserted through sleeve locking hole 100, locking lift slider 102 in place, preventing side play which can interfere with the swiveling of the swivel deck track lifting support 50. Also seen in the Figure is loading ramp hinge bracket 108, and a portion of the long center member 106.

After the swivel deck track lifting support 50 has been lowered as shown in FIG. 6, winch cable 29 is transferred from its split attachment position, to its swivel attachment position. Locking pins 98 are thereafter removed from pin tube 92 and sleeve locking hole 100, and lift slider 102 is telescoped into lift sleeve 104. Locking pin 98 is thereafter inserted in sleeve locking hole 100, the configuration shown in the Figure, allowing the swivel deck track lifting support to be freely swiveled downwards. The reverse procedure is followed after a car has been loaded onto the swivel deck 28.

Figure 7:
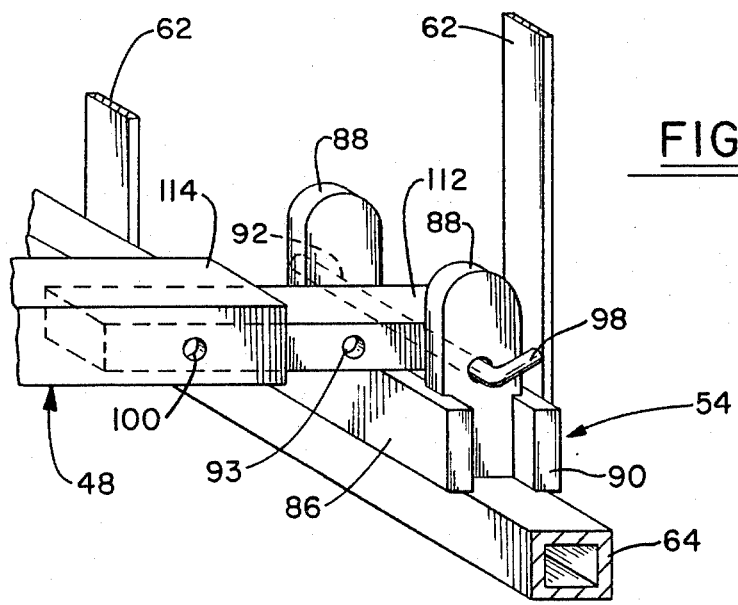
FIG. 7 provides an isometric view of a swivel deck intermediate perch and its associated structure.

FIG. 7 shows swivel deck track intermediate support 48 and its associated structure comprising logistic posts 62, longitudinal perch mount member 64, and intermediate perch 54, the latter including tuning block 86, perch rear member 90, and perch side members 88. Pin tube 92, associated with intermediate slider 112, holds the slider in place by means of locking pin 98 during the pivoting of intermediate support 48, and while it is in its stored position. When the swivel deck 28 is being swiveled, pin 98 is removed and slider 112 is telescoped into intermediate sleeve 114. Slider 112 is furnished with a slider lock hole 93 so that when the slider is telescoped into intermediate sleeve 114, a locking pin 98 may be inserted therethrough and also through sleeve locking hole 100, preventing interfering movement of the slider during the swiveling of swivel deck 28.

Figure 8:
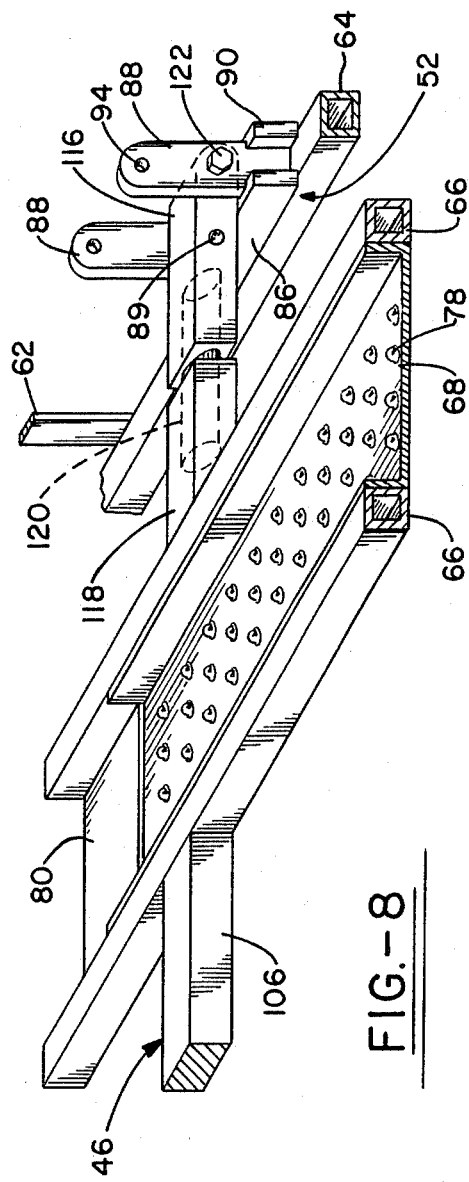
FIG. 8 illustrates an isometric view of a swivel deck swivel perch and the structure associated therewith.

FIG. 8 shows the swivel deck track swivel support 46 and its associated structure. In the Figure, longitudinal perch mount member 64 is shown attached to logistic posts 62, in support of swivel deck swivel perch 52 which comprises tuning block 86, perch rear member 90, and perch side members 88. Perch axle housing 116 is attached to swivel deck swivel perch 52 by means of bolt 122 inserted through pin tube 92, associated with the axle housing. Storage fastening holes 94 are provided in the perch side members 88 so that swivel deck track swivel support 46 may be locked in its storage position by means of a locking pin 98 passed therethrough, and also through locking pin tube 89, associated with axle housing 116. Swiveling of swivel deck track swivel support 46 is made possible by means of a swivel axle 120 inserted within and between center axle housing 118 and perch axle housing 116. Again, the details of track curb members 66, track gutter member 68, and stiffener plate 80 may be seen, as well as a portion of the long center member 106. While dimensions may vary, when the axle housings are hollow steel members having dimensions of about 2 inches high by 2 inches wide and a wall thickness of about ¼ inch, the use of a pivot axle with an outside diameter of between about 1½ to 1¾ inches is useful. The length of the cylindrical swivel axle may vary, it simply being desirable to have sufficient engagement on each side of the juncture point between the axel housings 116 and 118 so that the ends of the swivel axle cannot slip past the juncture point.

FIG. 9 shows a folding deck track support 47. In the Figure, logistic posts 62 are shown attached to the semi-trailer sidewalls 45, while folding deck perches 136 are supported by longitudinal perches mount members 64, attached to said logistic posts. Folding deck perches 136 comprise tuning blocks 86, perch rear members 90, and perch side members 88. Pivot members 134 are connected to folding deck perches 136 by means of bolts 122. Pivot members 134 are fitted with associated pin tubes 89 adapted to have locking pins 98 passed therethrough and through storage fastening holes 94 when the folding deck track support is in its stored position. Also shown in the Figure are track curb members 66, track gutter members 68, and stiffener plates 80. Attached to the center of track curb members 66 are long center member 106 and short center member 124, the two center members being connected by center splint sleeve 58, which is held in position for the purpose by locking pins 98.

Figure 10:
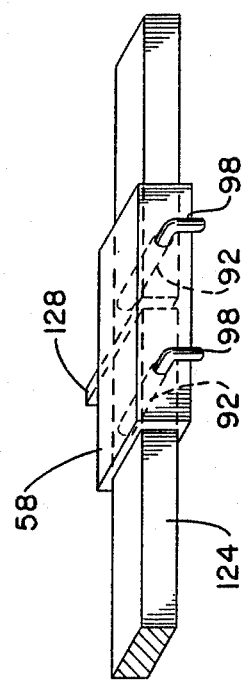
FIG. 10 is an isometric view of a deck support splice holding center members of a deck support and associated structure in position for carrying automobiles.

FIG. 10 shows center splint sleeve 58, which is common to all the support members of decks 24, 26 and 28. As will be seen from the Figure, center splint sleeve 58 fits over the juncture between long center member 106 and short center member 124, the positions of which may be reversed left to right, holding said members in alignment, and in effect, splicing them into a single structural unit. Center splint sleeve 58 is held in position by blocking pins 98 which extend through holes in the sleeve and pin tubes 92, associated with center members 106 and 124. When center splint sleeve 58 is not in use, it is stored on long center member 106. Driving lug 128, attached to sleeve 58, allows the sleeve to be struck with a maul and forcibly moved back and forth. An important feature of the design is that the center members 124 and 106 are of different lengths, which allows the center splint sleeve 58 to be longer, and thus to have a greater engaging contact with the center members than would be possible if such members were of equal length. Although dimensions may be varied, center splint sleeve 58 is commonly formed from a hollow member having a width and height of about 2½ inches with a sidewall thickness of about 3/16 inch. The length of center splint sleeve 58 depends on the relative length of the long and short center members 124 and 106; however, when these are about 16 to 20 inches and about 10 to 14 inches long, respectively, the sleeve will be about 16 to 20 inches long.

Figure 11:
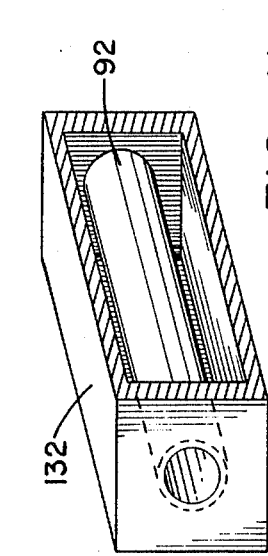
FIG. 11 shows an isometric view of a pin tube mounted in a structural member.

FIG. 11 shows a typical structural member 132 of the invention in which a pin tube 92 is disposed. Provision of a pin tube, although not absolutely necessary, is of considerable advantage, particularly in those instances where the locking pin is to be inserted through a structural member being subjected to forces acting at right angles to the locking pin. In such a situation, the pin tube serves to guide the locking pin through the connecting holes, making the connection much easier to effect.

While in accordance with the patent statutes, a preferred embodiment and mode has been presented, the scope of the invention is not limited thereto, but rather is measured by the scope of the attached claims.

What is claimed is:

1. A convertible automobile storage deck assembly for use with a truck capable of dual, convertible, freight hauling modes comprising:
   a folding deck, and
   a swivel deck,
both said decks being divided in their centers into longitudinal halves which can be pivoted from a vertical, stored, or general freight carrying mode adjacent the side walls of the truck, to a deployed, horizontal, automobile carrying mode wherein said longitudinal halves are fastened together by means of splint sleeves to form an automobile carrying deck, said swivel deck being swivelable vertically up or down about pivot means at its swivel end, and wherein said swivel deck is braced by a plurality of support members which include sleeve members and slider members, said slider members fastening said support members to the sidewalls of the truck when said swivel deck is in its stored mode, or in its deployed mode, but wherein said slider members can be disconnected from said sidewalls and telescoped into said sleeve members when the swivel deck is to be swiveled about its swivel end during automobile loading or unloading.

2. An assembly according to claim 1 in which said slider members are connected to said side walls by means of perches attached to said side walls, each of said perches comprising two parallel side members connected to a tuning block, wherein a slider member can be pivotally fastened between said side members by a locking pin extending through aligned pivot holes in said side members and through said slider member and, wherein said slider member rests on said tuning block.

3. An assembly according to claim 2 in which said slider member is hollow and contains a pin tube through which a locking pin can extend, pivotally fastening said side members and said slider member.

4. An assembly according to claim 2 in which at least some of said perches have aligned storage fastening holes above said pivot holes, and the sliders fastened to such perches have corresponding holes positioned therein so that when such sliders are raised to their stored mode, a locking pin may be inserted through such corresponding holes, and also through said storage fastening holes, thereby securing the support members to which said slider members are includeably attached in their stored mode.

5. An assembly according to claim 4 in which said slider members are hollow, and wherein said corresponding holes have pin tubes associated therewith.

6. An assembly according to claim 2 in which both the sleeve members and the slider members contain holes which may be aligned when the slider members have been telescoped into said sleeve members so as to allow a locking pin to be passed therethrough.

7. An assembly according to claim 1 in which said longitudinal halves are fastened together by fastening means comprising splint sleeves adapted to slide over the junctures between pairs of adjoining support center members, each of said adjoining support center members having holes therein positioned to align with corresponding holes in said splint sleeves, said holes when aligned being adapted to have locking pins inserted therethrough so that said splint sleeves can be secured across said junctures, thereby holding said adjoining support center members in horizontal alignment.

8. An assembly according to claim 7 in which said holes in said support center members are associated with pin tubes.

9. An assembly according to claim 7 in which each pair of said adjoining support center members is comprised of one support center member which is longer than the other support center member.

10. An assembly according to claim 1 in which the swivel means in said swivel deck is a swivelled deck track swivel support member divided in its center into longitudinal halves, comprising swivel axles, center axle housings and perch axle housings at each end of said halves, said swivel axles extending between and within said center axle housings and said perch axle housings, wherein said perch axle housings are connected to said sidewalls by means of perches secured by said sidewalls, and said halves are connectable by a splint sleeve, and wherein said swivel deck is swivelable up or down about said swivel axles after slide members in swivel deck track intermediate supports and a swivel deck track lifting support have been disconnected from said perches and have been telescoped away from said perches.

11. An assembly according to claim 1 in which said folding deck is comprised of at least two deck sections.

12. An assembly according to claim 11 in which one of said adjacent deck sections is fitted with deck interlock means to enabling both the adjacent sections to be raised or lowered simultaneously when such section is raised or lowered.

13. An assembly according to claim 1 in which said swivel deck is split by winching cables attached to the longitudinal halves of said swivel deck at first points, and in which said deck when loaded with automobiles is raised or lowered by winching cables attached to said swivel deck at second points, said first points being closer to the longitudinal center of the truck than said second points.

14. A semitrailer truck capable of conversion from a general freight carrying mode to an automobile containing mode which includes:
a convertible automobile storage deck assembly, and said assembly comprising
a folding deck, and
a swivel deck, both said decks being divided in their centers into longitudinal halves which can be pivoted from a vertical, stored, or general freight carrying mode adjacent the side walls of the truck, to a deployed, horizontal, automobile carrying mode wherein a said halves are fastened together by means of splint sleeves to form an automobile carrying deck, said swivel deck being swivelable vertically up or down about swivel means at its swivel end, and wherein said swivel deck is braced by a plurality of support members which include sleeve members and slider members, said slider members fastening said support members to the sidewalls of the truck when said swivel deck is in its stored mode, or in its deployed mode, but wherein said slider members can be disconnected from said sidewalls and telescoped into said sleeve members when the swivel deck is to be swiveled about its swivel end during automobile loading or unloading.

15. A semitrailer truck according to claim 14 which includes a stowable incline deck comprising:
incline deck halves, and
incline deck supports,
said incline deck halves being hingably attached to the walls of said truck, and said incline deck supports being hingably attached to the truck drop bulkhead, thus permitting said incline deck halves and said incline deck supports to be foldably stored against the truck walls and the truck drop bulkhead, respectively, when the truck is disposed in its general freight hauling mode, and also permitting them to form an incline over which automobiles may be driven when the truck is disposed in its automobile carrying mode.

16. A convertible automobile storage deck assembly for use with a truck capable of dual, convertible, freight hauling modes comprising:
a folding deck, and
a swivel deck,
both said decks being divided in their centers into longitudinal halves which can be pivoted from a vertical, stored, or general freight carrying mode adjacent the sidewalls of the truck, to a deployed, horizontal, automobile carrying mode wherein said longitudinal halves are fastened together to form an automobile carrying deck, said swivel deck being swivelable vertically up or down about pivot means at its swivel end, and wherein said swivel deck is braced by a plurality of support members which include sleeve members and slider members, said slider members fastening said support members to the sidewalls of the truck when said swivel deck is in its stored mode, or in its deployed mode, but wherein said slider members can be disconnected from said sidewalls and telescoped into said sleeve members when the swivel deck is to be swiveled about its swivel end during automobile loading or unloading, and in which said slider members are connected to said sidewalls by means of perches attached to said sidewalls, each of said perches comprising two parallel side members connected to a turning block, wherein a slider member can be pivotally fastened between said side members by a locking pin extending through aligned pivot holes in said side members and through said slider member and, wherein said slider member rests on said tuning block.

17. An assembly according to claim 16 in which said slider member is hollow and contains a pin tube through which a locking pin can extend, pivotally fastening said side members and said slider member.

18. An assembly according to claim 16 in which at least some of said perches have aligned storage fastening holes above said pivot holes, and the sliders fastened to such perches have corresponding holes positioned therein so that when such sliders are raised to their stored mode, a locking pin may be inserted through such corresponding holes, and also through said storage fastening holes, thereby securing the support members to which said slider members are includeably attached in their stored mode.

19. An assembly according to claim 18 in which said slider members are hollow, and wherein said corresponding holes have pin tubes associated therewith.

20. An assembly according to claim 16 in which both the sleeve members and the slider members contain holes which may be aligned when the slider members have been telescoped into said sleeve members so as to allow a locking pin to be passed therethrough.

* * * * *